United States Patent [19]

Jones

[11] Patent Number: 5,237,453
[45] Date of Patent: Aug. 17, 1993

[54] LIGHT ABSORBING VISOR FOR VIDEO DISPLAY TERMINALS

[75] Inventor: David S. Jones, San Francisco, Calif.

[73] Assignee: Lifestar International, Inc., San Francisco, Calif.

[21] Appl. No.: 903,003

[22] Filed: Jun. 23, 1992

[51] Int. Cl.⁵ .................. G02B 27/00; H04N 5/64
[52] U.S. Cl. .................... 359/601; 359/613; 359/614; 358/255
[58] Field of Search ........... 359/601, 614, 611, 612, 359/613; 358/252, 255; 353/97; D14/239; 2/12, 13, 177

[56] References Cited

U.S. PATENT DOCUMENTS

| | | | |
|---|---|---|---|
| 1,884,047 | 10/1932 | McClellan | 2/12 |
| 4,314,280 | 2/1982 | Rose | 258/255 |
| 4,446,571 | 5/1984 | Ross | 2/13 |
| 4,633,324 | 12/1986 | Giulie | 358/255 |
| 4,784,468 | 11/1988 | Tierney | 359/601 |
| 5,121,253 | 6/1992 | Waintroob | 358/252 X |

Primary Examiner—Bruce Y. Arnold
Assistant Examiner—David Parsons
Attorney, Agent, or Firm—Flehr, Hohbach, Test, Albritton & Herbert

[57] ABSTRACT

A visor or hood to shroud a light projecting video display tube is formed from a composite sheet material of limber, flexible character for mounting upon the flat top and side walls of the tube's enclosure and to flare outwardly therefrom into a curve or arch form. The layer of sheet material proximate the tube is made from a foam or rubber material of a dark, light absorbing color to confine the light scattered from the tube. A backing layer of flexible durable material adheres to the foam layer.

7 Claims, 2 Drawing Sheets

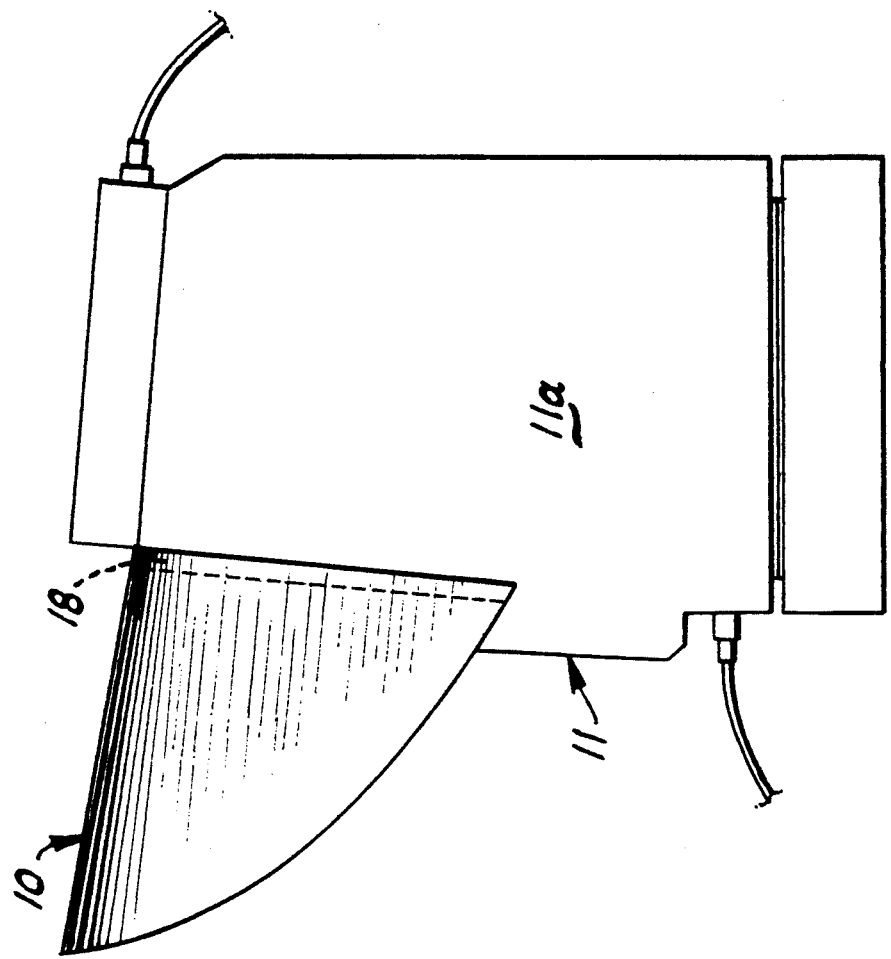
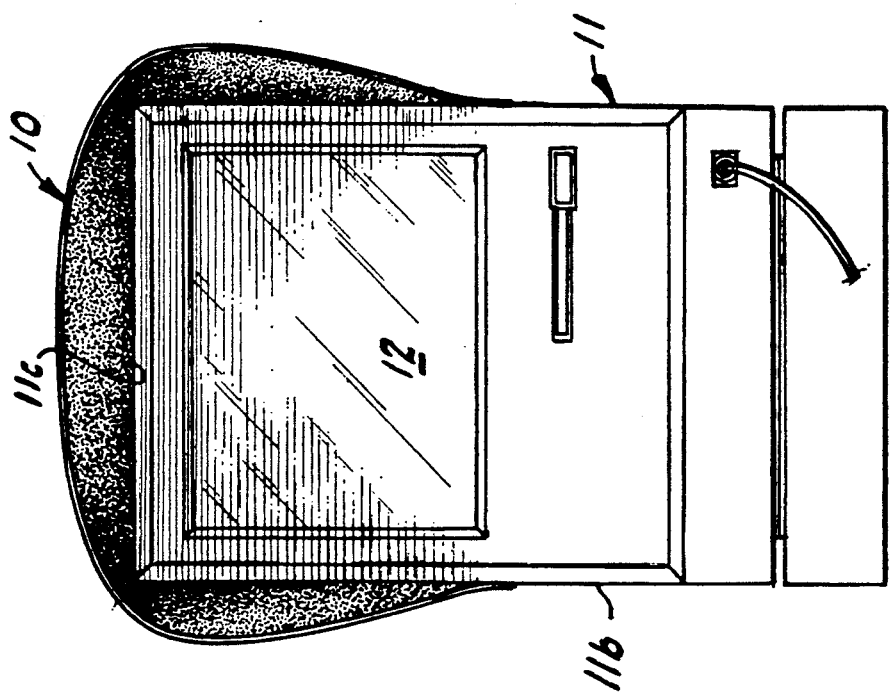

LIGHT ABSORBING VISOR FOR VIDEO DISPLAY TERMINALS

BACKGROUND OF THE INVENTION

This invention relates to devices for projecting the eyes from unwanted light and, particularly, to light absorbing visors for shielding the viewer's eyes from light emanating from a video display terminal and for shielding the terminal from ambient light.

Visual display devices, including video display terminals [VDT], monitors, television screens and the like, are quite frequently placed in environments with little regard for the ambient light sources which place extraneous light on the screen. These light sources include overhead lights, windows, desk lamps, and even reflected light from desk tops, walls and ceilings. The extraneous light frequently gives rise to eye strain and fatigue in persons using the video display terminals due to the resultant reduction in contrast and clarity of the information displayed on the screen. It is known that light reflecting from the VDT screen causes a measure of eye strain and in environments where people use computers throughout the work day, they are subject to various forms of stress, including fatigue, headaches, blurred vision, and decreased perception information. This results in increased errors in the data being processed and psychological depression in the individuals. Such conditions have been found in processing operations, including bank check processing facilities, credit card processing facilities, and the like.

Workers in the field have tried to reduce the glare upon the VDT by making shades or other similar devices from cardboard or paper and taping the shades to the cabinet containing the video display tube. U.S. Pat. No. 4,633,324 shows an adjustable shield which conforms to the side walls of the VDT cabinet and projects outwardly therefrom for shading the screen area. Other workers have devised transparent filters that fit over the VDT screen itself, resulting in reduced clarity of the information display on the screen and sometime requiring an increase of the operational brightness level of the VTD.

The prior art shields or hoods for computer terminals had several common features. Basically, the prior art products were fabricated from sheet plastic or injection molded, being offered in a fixed or restricted range of sizes. Those constructions were generally rectilinear in form so as to closely follow the top and sides of the VDT to which they were attached. The generally rectilinear form gave inside surfaces which were flat and parallel, and tended to support reflective standing waves from the non-light absorbing flat surfaces. The condition did not ameliorate eye fatigue in that the hood or visor had minimal, if any, light absorbing qualities.

SUMMARY OF THE INVENTION AND OBJECTS

Based upon the foregoing, there is found to be a need to provide a visor for a video display terminal which shields the glass surface of the terminal from ambient light sources above and from the sides, which has no flat or parallel surfaces to encourage standing waves and other light reflections, and is constructed of a light absorbing material to create a dark visual field surrounding the video display terminal.

Another object of the invention is to provide a visor for a video display terminal which is configured for mounting upon terminals in a wide range of sizes and to serve efficiency for controlling the light with respect to the forward projection surface of the terminal.

Another object of the invention is to provide a visor for a video display terminal which is readily attached to the cabinet of the VDT by a releasable connection so that the visor may be later dismounted and mounted again on another VDT, when desired.

Another object of the invention is to provide an improved visor for a VDT which provides the user of the terminal with a measure of ease and relaxation from the reduction of eye strain and resulting stress.

Yet another object of the invention is to provide a visor for a video display terminal which may be efficiently manufactured from a composite sheet material, such as by a dye cutting operation.

These and other objects are accomplished by a hood or visor mountable on a cabinet enclosing a video display tube for protecting the viewer's eyes from unwanted light while not impeding a view of the tube. The visor is made of a composite sheet material of limber and flexible character sufficient to conform closely to the flat sides and top portions of the VDT cabinet when mounted thereon. The material has sufficient body to project from the cabinet into a curve-form, outward flare having substantially no parallel surfaces to support standing light waves from light emanating from the video display terminal when active. The sheet material is sized to project from the cabinet a distance sufficient to shield the tube from ambient light and has means for adhering such sheet material to the cabinet. One layer of the composite sheet material is formed from a foam-like material of a dark, light absorbing color serving to absorb and confine the light scattered from the tube when the layer is arranged adjacent thereto.

These and other objects of the invention will become apparent from the description of the invention taken in connection with the following drawings.

BRIEF DESCRIPTION OF THE DRAWINGS

FIG. 1 is a front elevational view of the visor or hood of the present invention shown operatively mounted upon a computer monitor;

FIG. 2 is a side elevational view of the subject matter of FIG. 1;

DETAILED DESCRIPTION OF THE INVENTION

Turning now to the drawings, a light absorbing visor 10 on the invention is shown in FIGS. 1 and 2, operatively mounted upon a cabinet 11 of a video display terminal having a cathode ray tube 12, shown in FIG. 1. The unit 11 and 12 may serve as a monitor for a personal computer or the like. It may be seen that the cabinet 11 has substantially flat sides 11A and 11B joined by a flat top surface 11C. The visor 10, along one portion, conforms closely to the flat surfaces of the cabinet 11 and projects outwardly from the sides and top a distance sufficient to shield the display tube 12 from ambient light from the sides and above. The visor in place presents a curved form, looking much like the hooded cap seen in paintings of Dutch women. The flare of the visor 10 surrounds the display tube 12 over about 270° of arc. It can be recognized that the visor 10 has substantially no parallel surfaces, due to the outward flare, and thus inhibits the formation of standing light waves such as are generated between parallel flat surfaces.

Figure 3:
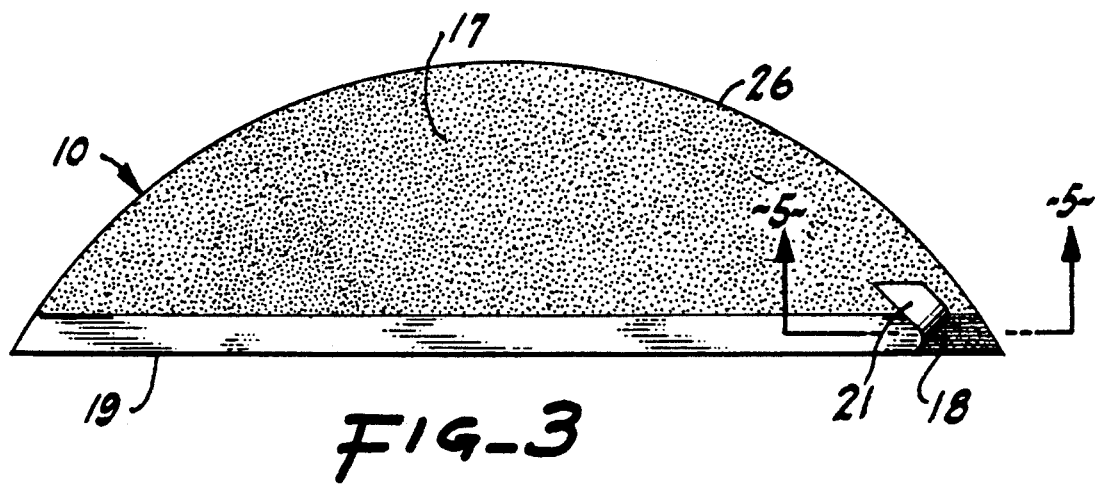
FIG. 3 shows the visor in a developer or flat condition illustrating the layer of foam material.
Figure 4:
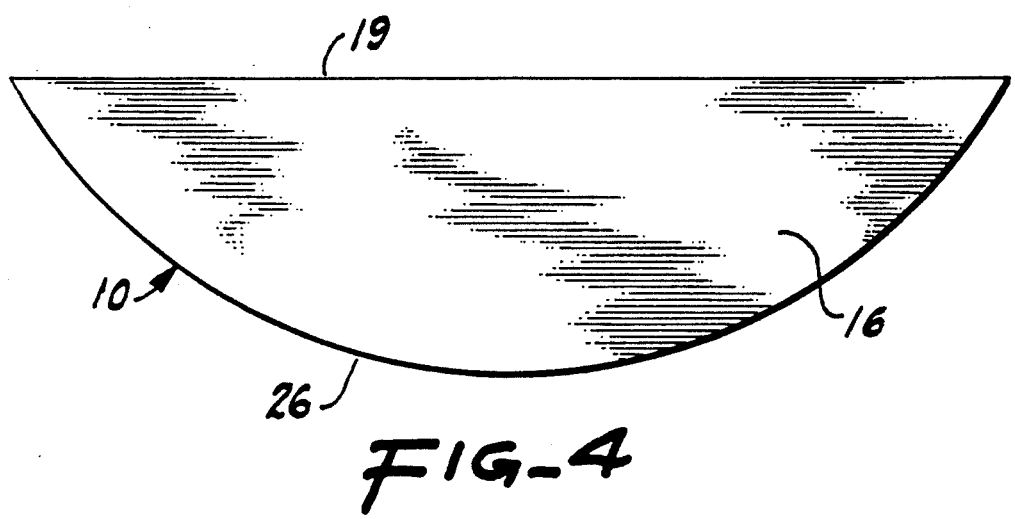
FIG. 4 is a view like FIG. 3 but illustrating the layer of backing material.
Figure 5:
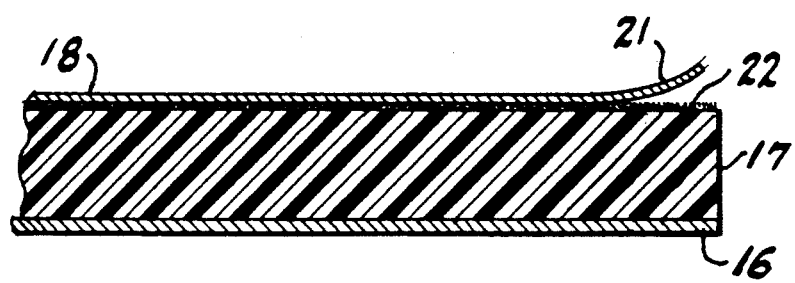
FIG. 5 is an enlarged section view taken in the direction of the arrows 5—5 of FIG. 3.

Referring to FIGS. 3 through 5, the visor 10 is preferably formed from a composite sheet material and may be fabricated in a dye cutting technique well known in the field. One satisfactory formulation of the sheet material is to use as an outer backing layer a sheet 16 of polyvinylchloride on the order 15 mil. thickness. Adhered to the layer of PVC is a layer of closed-cell neoprene sponge 17 of 1/16 inch thickness, black in color, and manufactured to conform to the ASTM standard 1056–73. The color black, as well as a near-black, such as a deep blue, deep brown, deep green, are quite effective for absorbing light rays such as emanating from a video display tube. The layer 16 may be laminated to the neoprene layer 17 using an adhesive such as the Scotch brand no. 950 adhesive, available from the 3M Company of Minneapolis, Minn.

Serving to secure the visor or hood 10 to the flat walls of the cabinet 11 is an adhesive strip 18, FIG. 3, arranged along the longitudinal edge 19 of the visor. The adhesive strip may be a length of adhesive tape with a removable backing 21, which protects the adhering surface 22 until the time of use and mounting of the visor. The adhesive permits the visor to be dismantled from the cabinet and used with another cabinet. A hook and loop fabric attachment is an alternative means for mounting the visor.

As shown in FIGS. 3 and 4, it will be seen that the visor 10 in plan form, or in the flat condition, has a broad curved edge 26, which joins the straight edge 19. The curved edge 26 is a compound curve, comprising a major central curve and two shorter radii end curves, such as encountered in a segment of an ellipse taken parallel to the major axis of the ellipse.

When mounted to a video display terminal, as shown in FIGS. 1 and 2, it has been found that the dark color foam or neoprene material 17 absorbs substantially all the light emanating from the video display terminal. Being that the visor as it projects from the terminal has no flat or parallel surfaces, it materially reduces the formation of standing light waves. Further, ambient light is shielded from the display surface of the tube 12.

Due to the simplicity of the shape of the visor 10, it is widely adaptable to the broad range of cabinets found today for computers. It is no longer necessary to make a large range of visors to suit the various sizes of computer monitors.

The composite material from which the visor is formed is flexible and has sufficient body so as to occupy the positions illustrated in FIGS. 1 and 2 over a long period of time in use. The layer 16 serves as a backing and supplies structural strength and stiffness to the foam neoprene 17. This selection of the material enables that visor to be shipped in a flat or in a rolled condition and the unit thereby requires very little in the way of packaging. It may be seen that the curved edge 26 of the visor, when in the mounted position, assumes a hyperbolic curve starting at the visor attachment points at the lower portions along the walls of the cabinet to the outermost point where the visor is in the most extended position with respect to the cabinet.

Having described the preferred embodiments of the invention above, it will be realized that the invention is susceptible to the various modifications and arrangements without departing from the inventive concept thereof as it is defined in the appended claims.

What is claimed is:

1. A visor or hood mountable upon a cabinet having flat sides and top portions and enclosing a video display tube, the visor serving to protect the viewer's eyes from unwanted light while not impeding a view of the tube, said visor being made from a composite sheet material of limber and flexible character sufficient to conform closely to the flat sides and top portions of the cabinet when mounted thereon and having sufficient body to project outwardly therefrom into a curve-form, outward flare having substantially no parallel surfaces to support standing light waves from light emanating from the video display tube when active, the sheet material being sized to project from the cabinet a distance sufficient to shield the tube from ambient light and means for adhering said sheet material to the cabinet, one exposed layer of said composite sheet material being formed from a foam-like material of a dark, light absorbing color serving to absorb and confine the light scattered from the video display tube when said layer is arranged adjacent thereto.

2. The visor of claim 1 wherein the composite sheet material includes another later of flexible, durable material serving as a backing for said layer of exposed foam-like material.

3. The visor of claim 2 wherein said foam-like material layer is composed of closed cell, black neoprene sponge.

4. The visor of claim 1 wherein the visor is formed from a body of sheet material having two parallel planar surfaces, said body having two edges, a first substantially linear edge and a second curvilinear edge, the edges merging together at their respective ends, said means for adhering the sheet material to the cabinet being disposed along said first edge.

5. The visor of claim 4 wherein the body comprises a segment of an ellipse taken parallel to the major axis of the ellipse.

6. The visor of claim 4 wherein said means for adhering the sheet material to the cabinet is an adhesive strip having a protective backing removable to expose the adhesive prior to mounting upon the cabinet.

7. The visor of claim 4 wherein said means for adhering the sheet material to the cabinet is a two part fabric hook and loop assembly wherein one part is mountable upon the cabinet and the second part is mounted upon the body of sheet material.

* * * * *